No. 798,200. PATENTED AUG. 29, 1905.
C. W. MERRILL.
PROCESS OF REMOVING SOLID OR SEMISOLID MATERIAL FROM CONTAINERS OF PRESSURE FILTERS.
APPLICATION FILED JAN. 2, 1904.
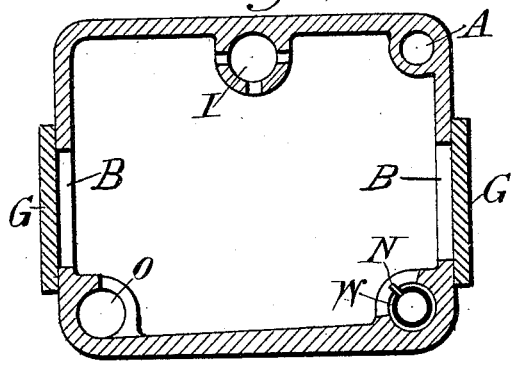
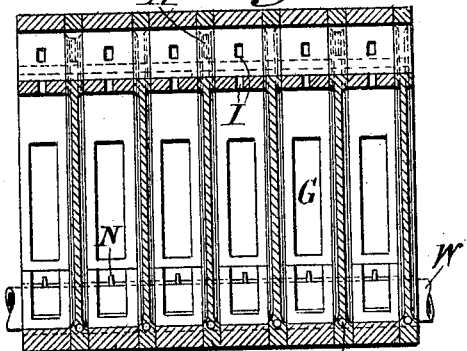
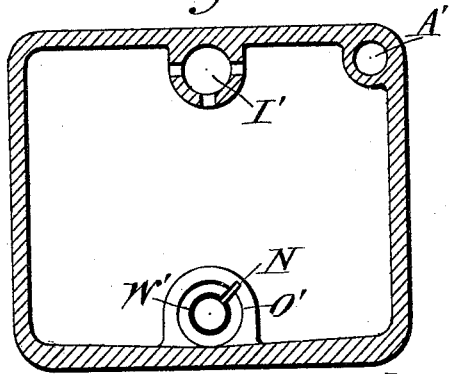
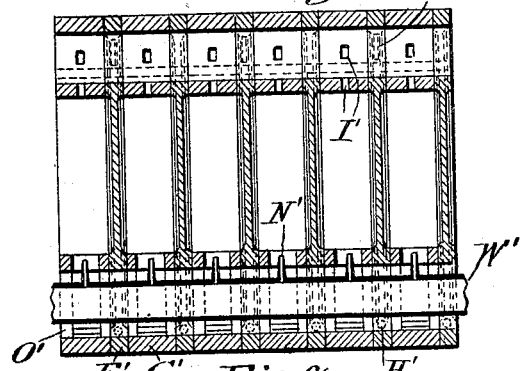
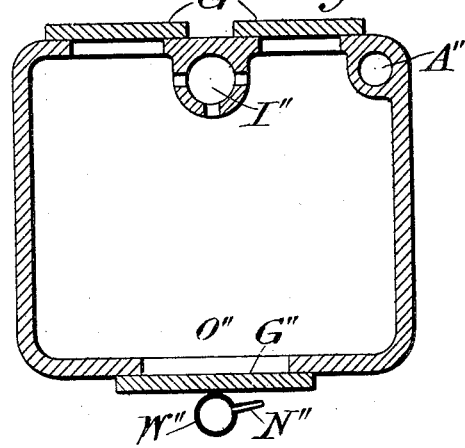
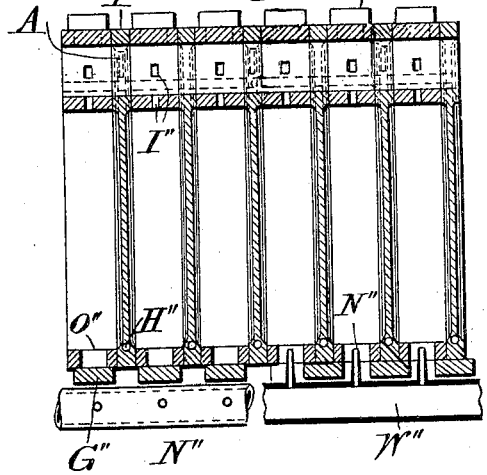
Witnesses:
John French
Charles Engel
Inventor.
Charles W. Merrill
by his attorney

UNITED STATES PATENT OFFICE.

CHARLES W. MERRILL, OF LEAD, SOUTH DAKOTA.

PROCESS OF REMOVING SOLID OR SEMISOLID MATERIAL FROM CONTAINERS OF PRESSURE-FILTERS.

No. 798,200. Specification of Letters Patent. Patented Aug. 29, 1905.

Application filed January 2, 1904. Serial No. 187,565.

*To all whom it may concern:*

Be it known that I, CHARLES W. MERRILL, a citizen of the United States of America, and a resident of Lead, in the county of Lawrence and State of South Dakota, have invented certain new and useful Improvements in Processes of Removing Solid or Semisolid Material from Containers of Pressure-Filters, of which the following is a specification.

My invention relates to improvements in processes for removing the semisolid material from the containers of filter-presses; and the primary object of my improvements is to facilitate and cheapen the removal from its containers of the material which will not pass through the filtering medium.

A secondary object is to permit of the independent introduction of cleansing, precipitating, or other material to said containers.

In the operation of filter-presses or similar pressure-filters it is customary to separate the units of which each press is composed and remove the solid, semisolid, or unfilterable material from the distance frame or container, usually separately by hand. This method is naturally expensive in view of each unit of material so removed, as the wear and tear on the filtering medium covering the filter-plates is heavy, and the time so occupied during which the press cannot be used for filtering greatly reduces its capacity per unit of time. Hence the scope of the ordinary filter-press is limited to the separation of solids from liquids to cases where the value of such materials is such as to permit of the expenses outlined above. Furthermore, the necessity of removing the filtered material from each distance-frame separately results in the use of deep distance-frames in order to increase their separate capacity. Moreover, the resultant thick cake of solid or semisolid material increases the pressure necessary to accomplish the filtering, and thus adds another factor to the cost of operating said filter-presses.

My improved process consists in so constructing the containers of a filter-press as to permit removing the solid or semisolid material from the containers without separating the units of the pressure-filter. To accomplish this, I provide an inlet for each distance frame or container, through which a liquid, vapor, or gas is introduced under pressure and the solid, semisolid, or unfilterable contents sluiced or forced out through an exit from said frame. This exit may be an independent outlet, or it may be the opening through which the material to be filtered is originally introduced.

The invention will be best understood by means of the accompanying sheet of drawings, which show types of the apparatus in which my process is carried out.

In the drawings, Figure 1 is a longitudinal cross-section of a container, and Fig. 2 is a vertical cross-section, Fig. 1, of a series of containers put together in the manner usual in filter-presses. Fig. 3 is a vertical longitudinal section of a modified form of container. Fig. 4 is a vertical longitudinal section of a series of such modified form of container put together. Fig. 5 is a vertical cross-section of a container of a still further modified form, and Fig. 6 is a vertical longitudinal section of a series of such modified form of containers put together. In Figs. 2, 4, and 6 the views show the vertical cross-section when looked at from left to right.

In the construction shown in Figs. 1 and 2 C is the frame of the container, which may be in cross-section of any convenient shape. B B are openings in the sides. O is an opening or outlet at one side through which the solid, semisolid, or unfilterable material, hereinafter for convenience called the "precipitate," is removed from the containers and which when a series of containers are put together in a filter-press makes a continuous opening through the press, which is closed at the ends in any convenient manner and discharges into any suitable receptacle. A is a corresponding inlet for treating the precipitate in place with liquids, vapors, or gases and which is preferably placed at either or both upper corners of the container and in like manner forms a continuous opening or openings when the containers are placed together in the filter-press. I is an inlet through which the material to be filtered is introduced, which inlet is of the same general character and becomes continuous when the containers are put together in the filter-press and is provided with the openings 1, 2, and 3, from which the material is introduced into the chamber. W is a supply pipe or channel through which the liquid, vapor, or gas is introduced under pressure for the purpose of removing the precipitate. This is provided with a nozzle, slit, or hole which enters into each container. F is the filter-plate, which is introduced between the containers. G is a gate which is used to close the opening B B.

In the second construction (shown in Figs.

3 and 4) the opening O', which corresponds to O in the structure shown in Figs. 1 and 2, is placed within the container and contains in its interior the supply-pipe W', fixed or rotative, which corresponds to the pipe W and like it is provided with nozzles N' N', similar to the nozzles N N, which pass into each container, a series of these being employed, as in the previous construction. I' represents the inlet through which the material to be filtered is introduced, which corresponds to the inlet I in Figs. 1 and 2.

In the third construction (shown in Figs. 5 and 6) the discharge is effected through a series of openings O'', which are closed by gates G'', and the supply-pipe W'', fixed or rotative, is provided with a similar series of nozzles N'', so that when the gates G'' are opened cleansing material may be introduced through the pipe W''. In each of the constructions outlets H, H', and H'', respectively, are provided for the effluent liquids, vapors, or gases.

I am aware that an attempt has been made to remove the solid or semisolid material from the containers of pressure-filters by applying the pressure of the water or air behind and through the cloths to squeeze back the unfilterable material; but I believe I am the first to accomplish the removal of any class of unfilterable material by direct impact or contact or impingement of a liquid, vapor, or gas under pressure with or upon the unfilterable material and introduced by a channel or nozzle directly through or into the chamber.

Therefore I claim—

1. The hereinbefore-described process of removing solid or semisolid material from the containers of pressure-filters, consisting in sluicing or forcing said material out by the impingement of a stream of liquid, vapor or gas under pressure acting from below upwardly upon the contents of said containers.

2. The hereinbefore-described process of removing solid or semisolid material from the containers of pressure-filters, consisting in sluicing or forcing said material out by the impingement of a movable stream of liquid, vapor or gas under pressure directly upon and below the upper surface of the contents of said filters without separating the units of the same.

3. The hereinbefore-described process of removing solid or semisolid material from the containers of pressure-filters, consisting in sluicing or forcing said material out by the impingement of a stream of liquid, vapor or gas under pressure introduced upon the contents of said filters at a point adjacent to the outlet thereof.

In testimony that I claim the foregoing as my invention, I have signed my name, in presence of two witnesses, this 24th day of December, 1903.

CHARLES W. MERRILL.

Witnesses:
GEO. D. FOGLESONG,
HORACE S. CLARK.